US011436674B2

(12) United States Patent
Carrozza et al.

(10) Patent No.: US 11,436,674 B2
(45) Date of Patent: Sep. 6, 2022

(54) METHODS, SYSTEMS, AND DEVICES FOR PROVIDING AN ENHANCED SPORTS LEAGUE SIMULATED STOCK EXCHANGE

(71) Applicant: Fandex, Inc., Durham, NC (US)

(72) Inventors: Kyle Carrozza, Albuquerque, NM (US); Matthew D'Alessandro, Bedminster, NJ (US); Nicholas Canova, N. Massapequa, NY (US)

(73) Assignee: FANDEX, INC., Durham, NC (US)

( * ) Notice: Subject to any disclaimer, the term of this patent is extended or adjusted under 35 U.S.C. 154(b) by 0 days.

(21) Appl. No.: 16/376,618

(22) Filed: Apr. 5, 2019

(65) Prior Publication Data

US 2019/0311432 A1 Oct. 10, 2019

Related U.S. Application Data

(60) Provisional application No. 62/652,960, filed on Apr. 5, 2018.

(51) Int. Cl.
*G06Q 40/08* (2012.01)
*G06Q 40/04* (2012.01)
*G06F 9/54* (2006.01)
*G06F 30/20* (2020.01)

(52) U.S. Cl.
CPC ............. *G06Q 40/04* (2013.01); *G06F 9/541* (2013.01); *G06F 30/20* (2020.01)

(58) Field of Classification Search
CPC ........ G06Q 40/00; G06Q 40/04; G06F 17/60; G06F 30/20; G06F 9/541; A63F 13/828; A63F 13/792

USPC ......................................................... 705/3–44
See application file for complete search history.

(56) References Cited

U.S. PATENT DOCUMENTS

| 5,971,854 A * | 10/1999 | Pearson ................... A63F 3/081 463/41 |
| 8,538,563 B1 * | 9/2013 | Barber ................. G07F 17/3276 463/28 |
| 10,147,266 B2 * | 12/2018 | Joao ..................... G07F 17/3288 |
| 11,351,465 B1 * | 6/2022 | Litman .................. A63F 13/828 |
| 2007/0060380 A1 * | 3/2007 | McMonigle ............ G07F 17/32 463/42 |

(Continued)

OTHER PUBLICATIONS

Akhigbe et al., "Predictable sports sentiment and local trading", Financial Management 46.2: 433(21), Financial Management Association, Jul.-Sep. 2017.*

*Primary Examiner* — Frantzy Poinvil
(74) *Attorney, Agent, or Firm* — Dentons US LLP (57) ABSTRACT

A computer implemented method is disclosed for providing a simulated sports league stock exchange associated with a real sports league having a plurality of real teams. The method includes receiving a first dataset including at least a portion of a season schedule associated with the real sports league via a first network-enabled back-end component and receiving a second dataset including real statistics and game results associated with the real sports league via a second network-enabled back-end component. The method further includes determining a first per-share value of a plurality of simulated shares associated with a first real team of the plurality of real teams using the first dataset and the second data set. The method also includes transmitting the first per-share value to a graphical user interface (GUI) via a first network-enabled front-end component.

17 Claims, 7 Drawing Sheets

(56) References Cited

U.S. PATENT DOCUMENTS

| | | | |
|---|---|---|---|
| 2008/0207333 A1* | 8/2008 | Johnson | A63F 13/798 |
| | | | 463/42 |
| 2015/0224406 A1* | 8/2015 | Wolgin | A63F 13/792 |
| | | | 463/9 |
| 2018/0001204 A1* | 1/2018 | Eisenstein | A63F 13/828 |
| 2019/0221072 A1* | 7/2019 | Litman | A63F 3/0665 |
| 2019/0362600 A1* | 11/2019 | Odom | G07F 17/3237 |
| 2020/0188799 A1* | 6/2020 | Croci | A63F 13/828 |

* cited by examiner

METHODS, SYSTEMS, AND DEVICES FOR PROVIDING AN ENHANCED SPORTS LEAGUE SIMULATED STOCK EXCHANGE

PRIORITY CLAIM

This application claims priority to U.S. Provisional Patent Application Serial No. 62/652,960 filed Apr. 5, 2018, the disclosure of which is incorporated herein by reference in its entirety.

TECHNICAL FIELD

The present invention relates to market trading simulation via a middleware architecture including front-end and back-end components. More specifically methods, systems, and devices are disclosed for providing an enhanced sports league simulated stock exchange including volatility and competition via a service-oriented architecture (SOA).

BACKGROUND

Fantasy sports games and other sports simulations involve statistics for real athletes used with virtual teams. Participants select their virtual teams from the real athletes and use the real world statistics of the real athletes. The virtual teams are then used in simulated competitions for prizes and/or monetary gain among the participants. A recent development also includes sports stock exchanges allowing participants (i.e. investors) to buy and sell shares in a simulated sports stock market associated with real teams in a sports league.

Accordingly, a need exists for new methods, systems, and devices for providing virtual exchanges including volatility and competition among investors for simulated sports teams trading markets.

SUMMARY

Disclosed herein are methods, systems, and devices for providing virtual sports team exchanges including volatility and competition among users (i.e. investors). According to one embodiment, a computer implemented method is disclosed for providing a simulated sports league stock exchange associated with a real sports league having a plurality of real teams. The method is implemented in a computer system having one or more physical processors programmed with computer program instructions. The computer program instructions, when executed by the one or more physical processors, cause the computer system to perform the method. The method comprises receiving a first dataset including at least a portion of a season schedule associated with the real sports league via a first network-enabled back-end component and receiving a second dataset including real statistics and game results associated with the real sports league via a second network-enabled back-end component. The method further includes determining a first per-share value of a plurality of simulated shares associated with a first real team of the plurality of real teams using the first dataset and the second data set. The method also includes transmitting the first per-share value to a graphical user interface (GUI) via a first network-enabled front-end component.

In some embodiments the real sports league may be the National Football League (NFL®), the National Basketball League (NBA®), the National Hockey League (NHL®), the Major League Baseball (MLB®) league, the Major League Soccer (MLS®) league, or the like. The portion of the season schedule may be a portion of a preseason schedule, a regular season schedule, or a post-season schedule associated with the real sports league.

In some embodiments, the real statistics may include preseason statistics. Determining the first per-share value may include determining a preseason per-share value of the plurality of simulated shares and may include determining a value rating for each player of at least a first portion of players associated with each team of the plurality of real teams, and include determining a per-team Elo rating for each team of the plurality of real teams. Determining the first per-share value may further include predicting results of a plurality of unplayed games in the portion of the season schedule using the per-team Elo-rating for each team. Predicting the results of the plurality of unplayed games may include predicting win probabilities and expected wins for each team for each game of the plurality of unplayed games.

In some embodiments, the method may further include (1) storing the first per-share value as at least a portion of a record in a database; (2) receiving a third dataset including updated real statistics associated with the real sports league via the second network-enabled back-end component; (3) determining, by the computer system using the third dataset, a second per-share value of a plurality of simulated shares associated with the first real team of the plurality of real teams; and (4) transmitting the second per-share value to the GUI via the first network-enabled front-end component.

In some embodiments, the GUI may be associated with a computing device associated with a first user. The computing device may be a personal computer (PC), a laptop, a tablet, a smart watch, a smart television (TV), a holographic projector, or the like. The GUI may also be provided by a web browser or by a dedicated application and the GUI may be configured to receive a plurality of per-share values associated with at least a portion of the plurality of real teams.

In some embodiments, the method may further include determining a first account balance of the first user and transmitting the first account balance to the GUI. Determining the first account balance of the first user may be based at least partially on a number of simulated shares purchased by the first user.

In another embodiment, at least one server is configured for providing a simulated sports league stock exchange associated with a real sports league having a plurality of real teams. The server or servers include at least one memory and at least one processor coupled with the memory. The processor or processors are configured for receiving a first dataset including at least a portion of a season schedule associated with the real sports league via a first network-enabled back-end component and receiving a second dataset including real statistics and game results associated with the real sports league via a second network-enabled back-end component. The processor or processors are further configured for determining a first per-share value of a plurality of simulated shares associated with a first real team of the plurality of real teams using the first dataset and the second data set, and includes transmitting the first per-share value to a GUI via a first network-enabled front-end component.

In another embodiment, a non-transitory computer-readable storage medium storing instructions is configured to be implemented on at least one server including at least one processor for providing a simulated sports league stock exchange associated with a real sports league having a plurality of real teams. The instructions when executed by the processor or processors cause the at least one server to perform a method of receiving a first dataset including at least a portion of a season schedule associated with the real sports league via a first network-enabled back-end component and receiving a second dataset including real statistics and game results associated with the real sports league via a second network-enabled back-end component. The method further includes determining, using the first dataset and the second data set, a first per-share value of a plurality of simulated shares associated with a first real team of the plurality of real teams and transmitting the first per-share value to a GUI via a first network-enabled front-end component.

According to another embodiment, a method is implemented on at least one server for providing a simulated sports league stock exchange associated with a real sports league having a plurality of real teams. The method includes identifying interface requirements for a set of services to be implemented between service-oriented architecture (SOA) front-end components and SOA back-end components. A first SOA back-end component is configured for receiving a first dataset including at least a portion of a season schedule associated with the real sports league and a second SOA back-end component is configured for receiving a second dataset including real statistics and game results associated with the real sports league. A first SOA front-end component is configured for communication with a GUI and the SOA front-end components are operable to be combined with the SOA back-end components to form an operable SOA solution. The method further includes determining, using the first dataset and the second data set, a first per-share value of a plurality of simulated shares associated with a first real team of the plurality of real teams and transmitting the first per-share value to the GUI.

According to another embodiment, a server is disclosed for providing a simulated sports league stock exchange associated with a real sports league having a plurality of real teams. The server includes at least one memory and at least one processor configured to provide a method. The method includes identifying interface requirements for a set of services to be implemented between SOA front-end components and SOA back-end components. A first SOA back-end component is configured for receiving a first dataset including at least a portion of a season schedule associated with the real sports league and second SOA back-end component is configured for receiving a second dataset including real statistics and game results associated with the real sports league. A first SOA front-end component is configured for communication with a GUI and the SOA front-end components are operable to be combined with the SOA back-end components to form an operable SOA solution. The method further includes determining, using the first dataset and the second data set, a first per-share value of a plurality of simulated shares associated with a first real team of the plurality of real teams and transmitting the first per-share value to the GUI.

In some embodiments, the server may be a portion of a networked computing environment. The networked computing environment may be a cloud computing environment and the at least one server may be a virtualized server. Additionally, the first back-end SOA component, the second back-end SOA component, and the first SOA front end component may each be configured to communicate over the Internet.

According to another embodiment, a non-transitory computer-readable storage medium is disclosed for providing a simulated sports league stock exchange associated with a real sports league having a plurality of real teams. The non-transitory computer-readable storage medium stores instructions to be implemented on at least one computing device including at least one processor. The instructions when executed by the at least one processor cause the at least one computing device to perform a method. The method includes identifying interface requirements for a set of services to be implemented between SOA front-end components and SOA back-end components. A first SOA back-end component is configured for receiving a first dataset including at least a portion of a season schedule associated with the real sports league and second SOA back-end component is configured for receiving a second dataset including real statistics and game results associated with the real sports league. A first SOA front-end component is configured for communication with a GUI and the SOA front-end components are operable to be combined with the SOA back-end components to form an operable SOA solution. The method further includes determining, using the first dataset and the second data set, a first per-share value of a plurality of simulated shares associated with a first real team of the plurality of real teams and transmitting the first per-share value to the GUI.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The subject matter disclosed herein relates to middleware including front-end and back-end components. More specifically; devices, systems, and methods are disclosed for providing a middleware solution that provides a solution for the problem of providing an enhanced sports league simulated stock exchange including volatility and competition.

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 1:
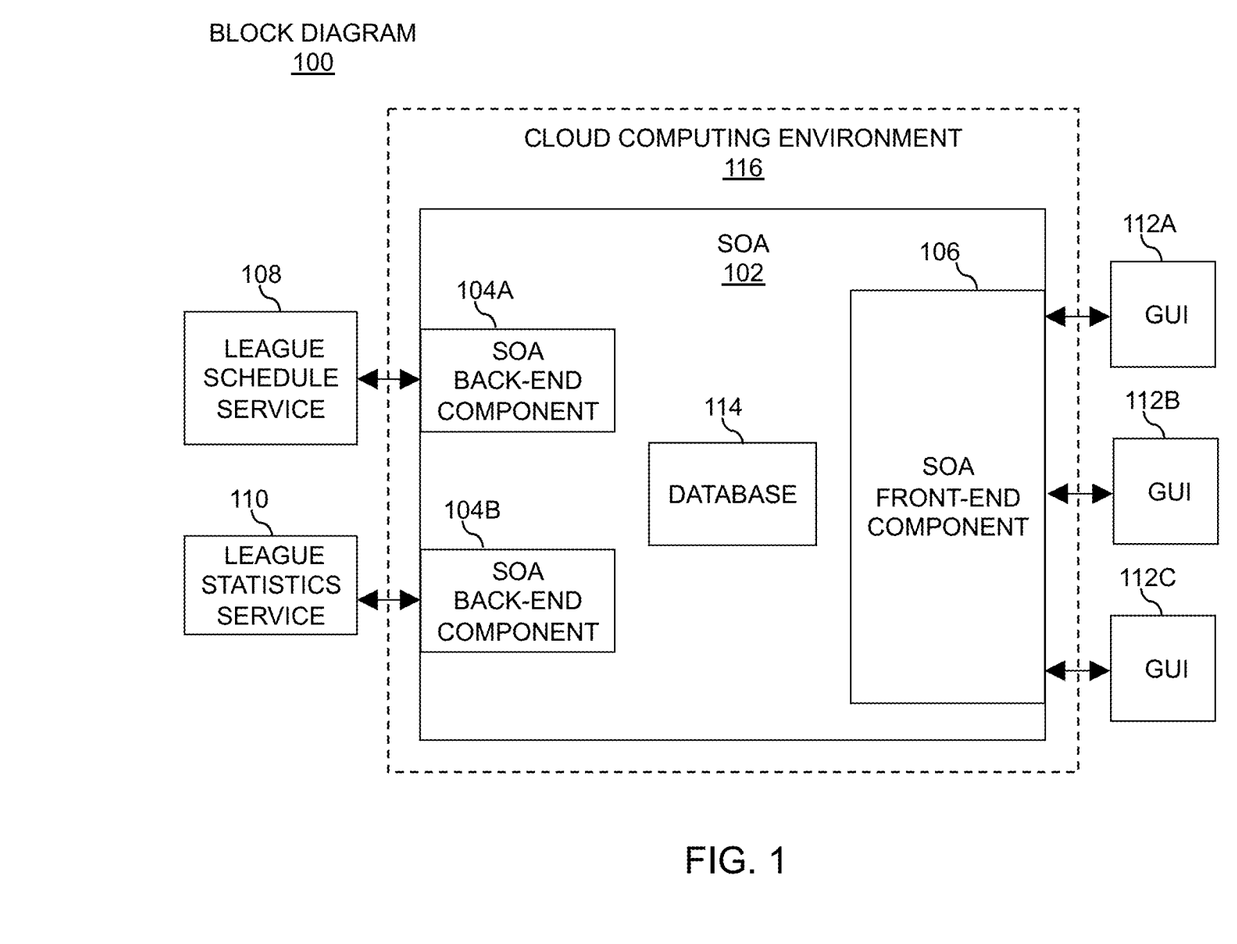
FIG. 1 depicts a block diagram illustrating a service-oriented architecture (SOA) for providing an enhanced sports league simulated stock exchange in accordance with embodiments of the present disclosure.

FIG. 1 depicts a block diagram 100 illustrating a service-oriented architecture (SOA) 102 for providing an enhanced sports league simulated stock exchange representing a plurality of real teams associated with a real sports league in accordance with embodiments of the present disclosure. For example, the real sports league may be the National Football League (NFL®), the National Basketball League (NBA®), the National Hockey League (NHL®), the Major League Baseball (MLB®) league, the Major League Soccer (MLS®) league, or the like.

The SOA 102 is configured to provide a collection of services, wherein the services communicate with each other. The communications may range from simple exchanges of data to two or more services for coordinating one or more activities. Each service may be a function that is self-contained and well-defined. Each service may not depend on a state or context of each of the other services.

The SOA 102 includes at least SOA back-end components 104A and 104b, and an SOA front-end component 106. The SOA back-end component 104A is configured to communicate with a league schedule service 108. The SOA back-end component 104A may receive a first dataset including at least a portion of a preseason schedule, a regular season schedule, and/or a post season schedule from the league schedule service 108. The SOA back-end component 104B is configured to communicate with a league statistics service 110. The SOA back-end component 104 B may receive a second dataset including real statistics for games played and/or players' performances associated with the real sports league. In some embodiments the league schedule service 108 and the league statistics service 110 may be a single service and the single service may communicate with only one SOA back-end component. The SOA 102 is further configured to determine at least a first per-share value of a plurality of simulated shares associated with at least one real team.

The SOA front-end component 106 is configured to communicate with a plurality of graphical user interfaces (GUIs) 112A-112C. Each GUI 112 may be provided by a user device (not shown in FIG. 1) such as a personal computer (PC), a laptop, a tablet, a smart television (TV), or the like. In some embodiments, the GUI may be at least partially provided by a holographic projector. The GUI may be further provided by a web browser configured for the user device. The web browser may be a Microsoft Internet Explorer® browser, a Microsoft Edge® browser, an Apple Safari® browser, a Google Chrome® browser, a Mozilla Firefox® browser, an Opera® browser, or the like. In other embodiments, the GUI may be further provided by a dedicated application developed specifically for the enhanced sports league simulated stock exchange. The SOA 102 is further configured to transmit the first per-share value to at least one of the GUIs 112A-112C.

The SOA 102 also includes a database 114. For example, the database may be an open source database such as the MongoDB® database, the PostgreSQL® database, or the like. The SOA 102 is implemented within a cloud computing environment 118. The cloud computing environment 116 is a networked computing environment including one or more servers. In some embodiments, the one or more servers may include one or more virtualized servers. The SOA 102 may also be implemented within a virtual container, for example the Docker® virtual container.

The SOA back-end components 104A-B and the SOA front-end component may also include one or more network interfaces. The one or more network interfaces may be one or more wide area network (WAN) interfaces, local area network (LAN) interfaces, wired interfaces, wireless interfaces, and/or optical interfaces. Additionally, the one or more network interfaces may use one or more transfer protocols such as a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), or a remote direct memory access (RDMA) transfer protocol. In some embodiments, one or more of the network interfaces may be configured to communicate over the Internet.

An additional front-end component (not shown in FIG. 1) may be configured to provide an administrator access secure web portal. The administrator access secure web portal may be configured to provide status and control of the SOA 102. For example, the administrator access secure web portal may allow for configuration of parameters of the enhanced sports league simulated stock exchange.

The SOA 102 may include a non-transitory computer readable medium including a plurality of machine-readable instructions, which when executed by one or more processors of the one or more servers, are adapted to cause the one or more servers to perform the steps of (1) receiving the first and second datasets, (2) determining the first per-share value, and (3) transmitting the first per-share value. In a preferred embodiment, the SOA 102 is implemented on a virtual (i.e. software implemented) server in the cloud computing environment 116. An Ubuntu® server (not shown in FIG. 1.) may provide the virtual server and may be implemented as a separated operating system (OS) running on one or more physical (i.e. hardware implemented) servers. Any applicable virtual server may be used for the Ubuntu® Server function. The Ubuntu® Server function may be implemented in the Microsoft Azure®, the Amazon Web Services® (AWS), or the like cloud computing data center environments. In other embodiments, the SOA 102 may be implemented on one or more servers in a networked computing environment located within a business premise or another data center.

The SOA 102 transforms the virtual server, the virtual container, and/or or the one or more servers into a machine that provides a solution for solving the problem of providing an enhanced sports league simulated stock exchange including volatility and competition among users (i.e. investors). Specifically, the SOA front-end components are operable to be combined with the SOA back-end components to form an operable SOA solution.

Figure 2:
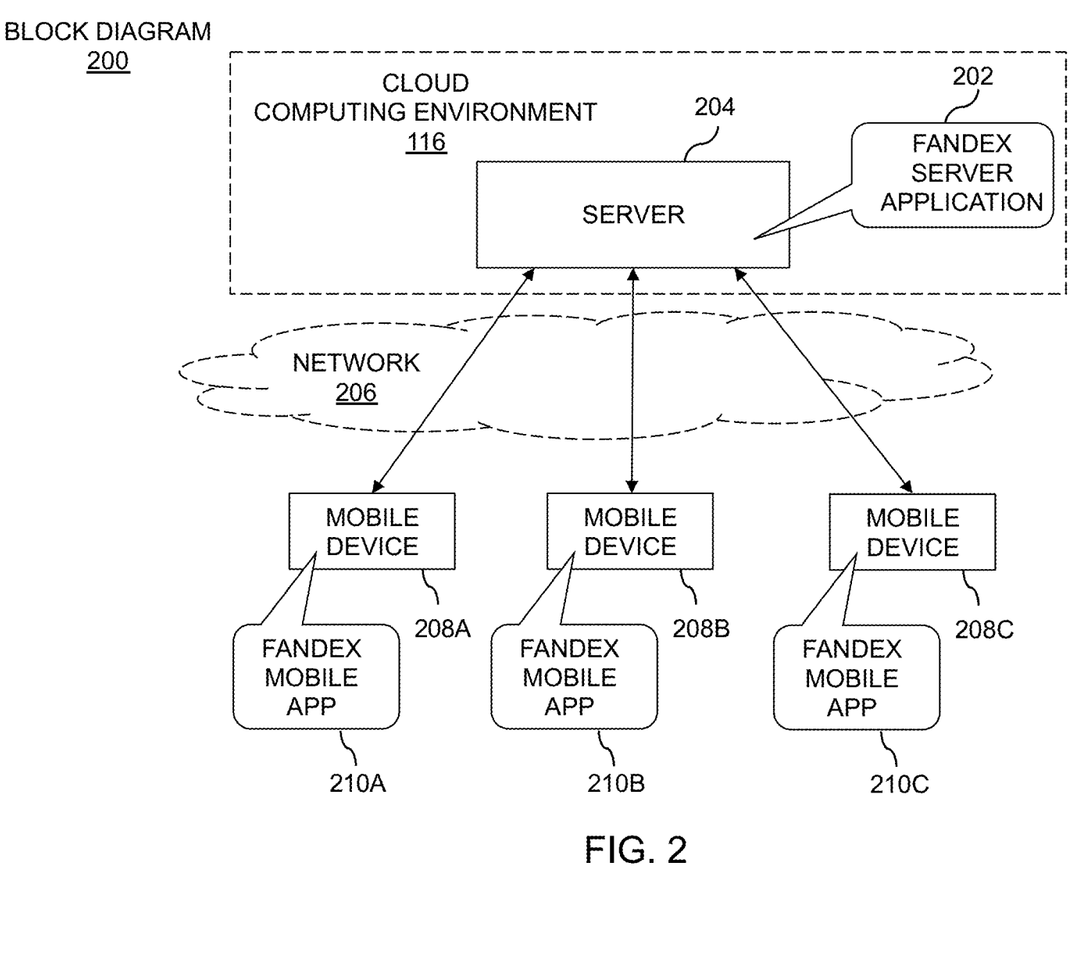
FIG. 2 depicts a block diagram illustrating a client/server architecture of an enhanced sports league simulated stock exchange in accordance with embodiments of the present disclosure.

FIG. 2 depicts a block diagram 200 illustrating a client/server architecture of the enhanced sports league simulated stock exchange in accordance with embodiments of the present disclosure. The cloud computing environment 116 of FIG. 1 is shown providing the Fandex server application 202 hosted with server 204. The Fandex server application 202 is provided on a non-transitory computer readable medium including a plurality of machine-readable instructions, which when executed by one or more processors of the server 204, are adapted to cause the server 204 to perform the steps of (1) receiving the first and second datasets, (2) determining the first per-share value, and (3) transmitting the first per-share value. Additional steps may further include (4) storing the first per-share value as at least a portion of a record in the database 114; (5) receiving a third dataset including updated real statistics associated with the real sports league, (6) determining, using the third dataset, a second per-share value of a plurality of simulated shares associated with the first real team of the plurality of real teams; and (7) transmitting the second per-share value. In general terms, the Fandex server application 202 provides the SOA 102 of FIG. 1.

The Fandex server application 202 is configured to communicate over a network 206. In a preferred embodiment, the network 206 is the Internet. In other embodiments, the network 206 may be restricted to a private LAN and/or WAN. The network 206 provides connectivity with mobile devices 208A-208C. Fandex mobile apps 210A-210C are hosted on mobile devices 208A-208C and provide the GUIs 112A-112C of FIG. 1. In a preferred embodiment, the Fandex server application 202 provides an application programming interface (API) for each Fandex mobile app 210.

Figure 3:
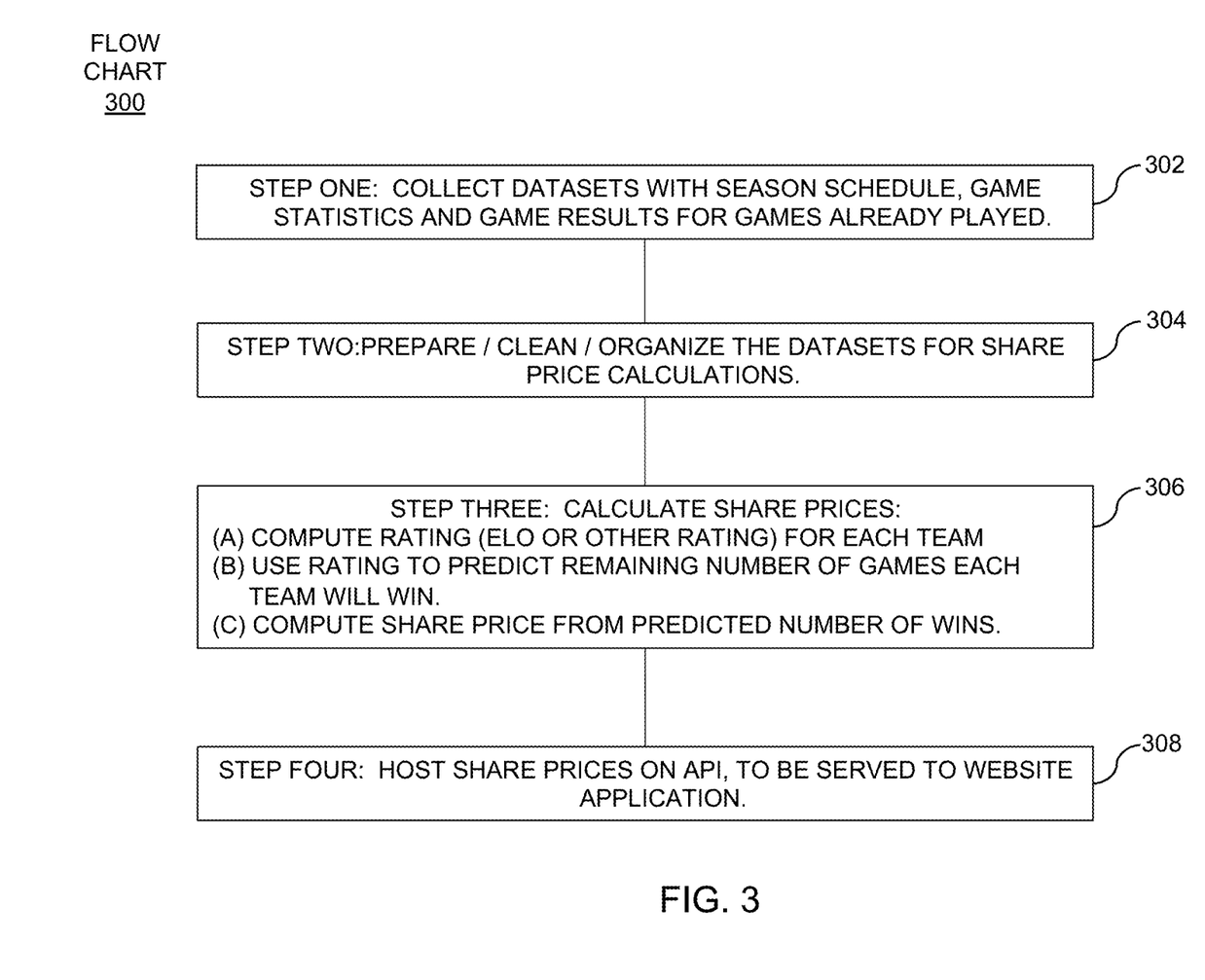
FIG. 3 depicts a flowchart illustrating a process for providing an enhanced sports league simulated stock exchange in accordance with embodiments of the present disclosure.

FIG. 3 depicts a flowchart illustrating a process for providing an enhanced sports league simulated stock exchange in accordance with embodiments of the present disclosure.

In step one 302, the SOA 102 collects (e.g. receives) datasets associated with team schedules, per game statistics, and game results for games already played. The datasets may be associated with preseason, regular season, or post season play of the real sports league. In certain embodiments, the datasets may be collected daily during a time when no games are being played. For example the datasets may be collected each day at 3:00 AM EST.

In step two 304, the SOA 102 organizes and preprocesses the datasets of step one 302 for per-share price calculations. The preprocessed datasets may be stored in the database 114 of FIG. 1.

In step three 306, the SOA 102 calculates share prices. First an ELO rating or other type of rating is computed. Next, this rating is used to predict the remaining number of games each team will win and/or the total number of points each team is expected to score. Additionally, previous predictions may be used in this determination. Then a per-share price for each team is computed from the prediction. The per-share price for each team may also be stored in the database 114. In some embodiments the database 114 may be one or more "comma separated values" CSV files. The daily datasets are checked and compared against previous datasets for discrepancies. If a discrepancy is determined a previous dataset or portion of a previous dataset may be used.

In step four 308, the per-share price for each team is hosted on an API available to each Fandex mobile app 210 over the network 212 of FIG. 2. Once all shares of all teams are sold to users, the pre-share prices may transition to values determined by buy/sell demands of users.

Figure 4:
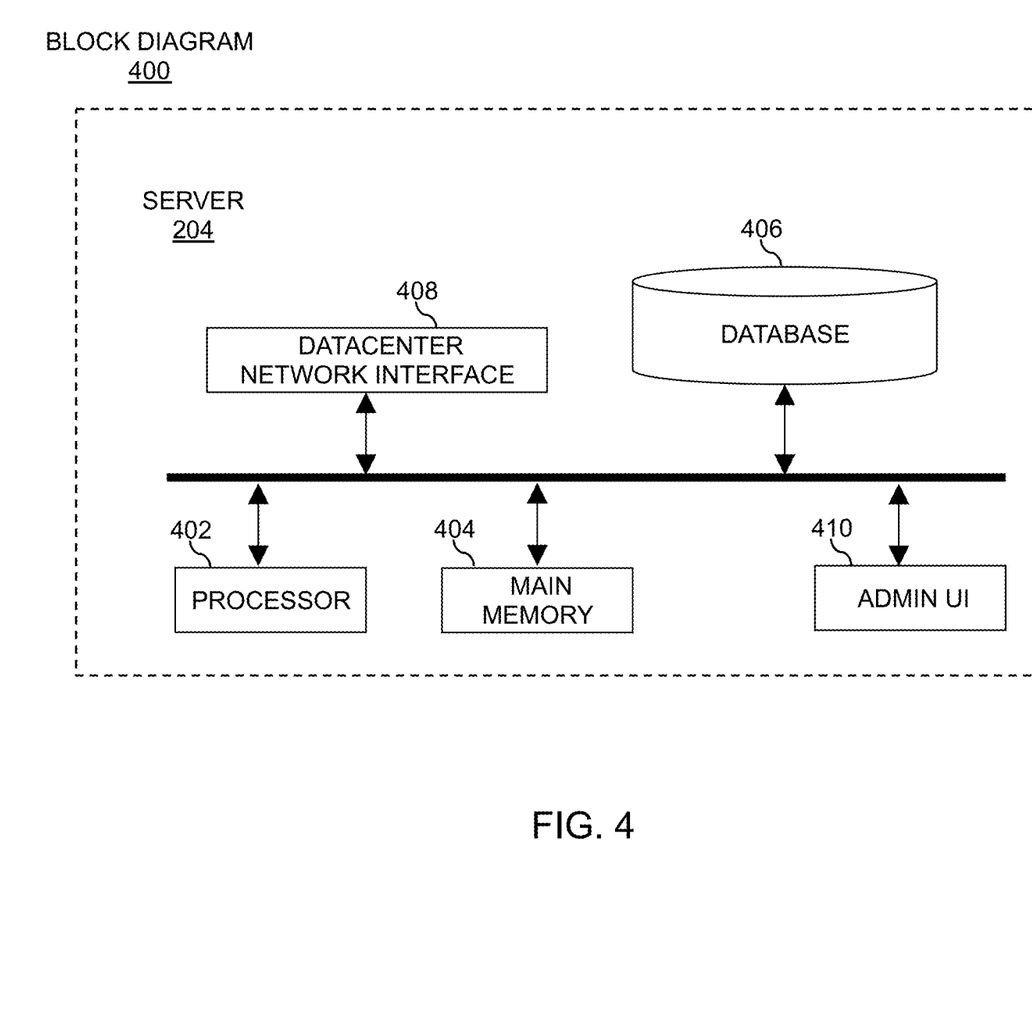
FIG. 4 depicts a block diagram of a server in accordance with embodiments of the present disclosure.

FIG. 4 depicts a block diagram 400 of the server 204 of FIG. 2 for hosting at least a portion of the SOA 102 of FIG. 1 and/or Fandex server application 202 of FIG. 2 in accordance with embodiments of the present disclosure. The server 204 is a hardware server and may include at least one of a processor 402, a main memory 404, a database 406, a datacenter network interface 408, and an administration user interface (UI) 410. The server 200 may be configured to host one or more virtualized servers. For example the virtual server may be an Ubuntu® server or the like and as discussed in FIG. 2. The server 204 may also be configured to host a virtual container. For example, the virtual server may be the Docker® virtual server or the like. In some embodiments, the virtual server and or virtual container may be distributed over a plurality of hardware servers using hypervisor technology.

The processor 402 may be a multi-core server class processor suitable for hardware virtualization. The processor 402 may support at least a 64-bit architecture and a single instruction multiple data (SIMD) instruction set. The memory 404 may include a combination of volatile memory (e.g. random access memory) and non-volatile memory (e.g. flash memory). The database 406 may include one or more hard drives. The database 406 may provide at least a portion of the functionality of the database 114 described with FIG. 1.

The datacenter network interface 408 may provide one or more high-speed communication ports to the data center switches, routers, and/or network storage appliances. The datacenter network interface may include high-speed optical Ethernet, InfiniBand (IB), Internet Small Computer System Interface iSCSI, and/or Fibre Channel interfaces. The administration UI may support local and/or remote configuration of the server by a data center administrator.

Figure 5:
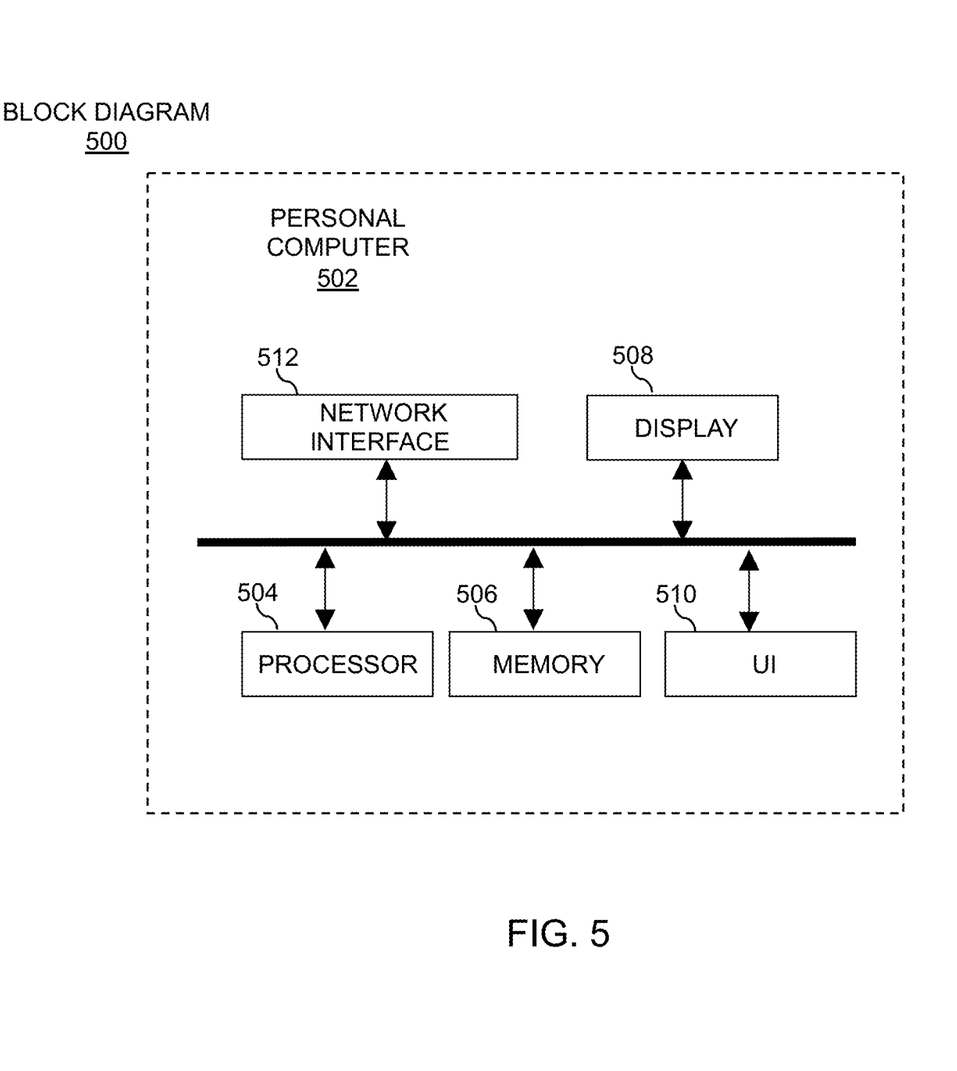
FIG. 5 depicts a block diagram of a personal computer in accordance with embodiments of the present disclosure.

FIG. 5 depicts a block diagram 500 of a personal computer 502 in accordance with embodiments of the present disclosure. The personal computer 502 is configured to provide at least one of the GUIs 112A-112C of FIG. 1. The personal computer 502 may include at least a processor 504, a memory 506, a display 508, a user interface (UI) 510, and a network interface 512. The personal computer 800 may include an operating system to run the web browser or dedicated application as discussed in FIG. 1. The operating system (OS) may be a Windows® OS, a Macintosh® OS, a Linux® OS, or the like. The memory 506 may include a combination of volatile memory (e.g. random access memory) and non-volatile memory (e.g. solid state drive and/or hard drives).

The network interface 512 may be a wired Ethernet interface or a Wi-Fi interface. The personal computer 502 may be configured to access remote memory (e.g. network storage and/or cloud storage) via the network interface 512. The UI 510 may include a keyboard, and a pointing device (e.g. mouse). The display 508 may be an external display (e.g. computer monitor) or internal display (e.g. laptop). In some embodiments, the personal computer may be a smart TV. In other embodiments, the display 508 may include a holographic projector.

Figure 6:
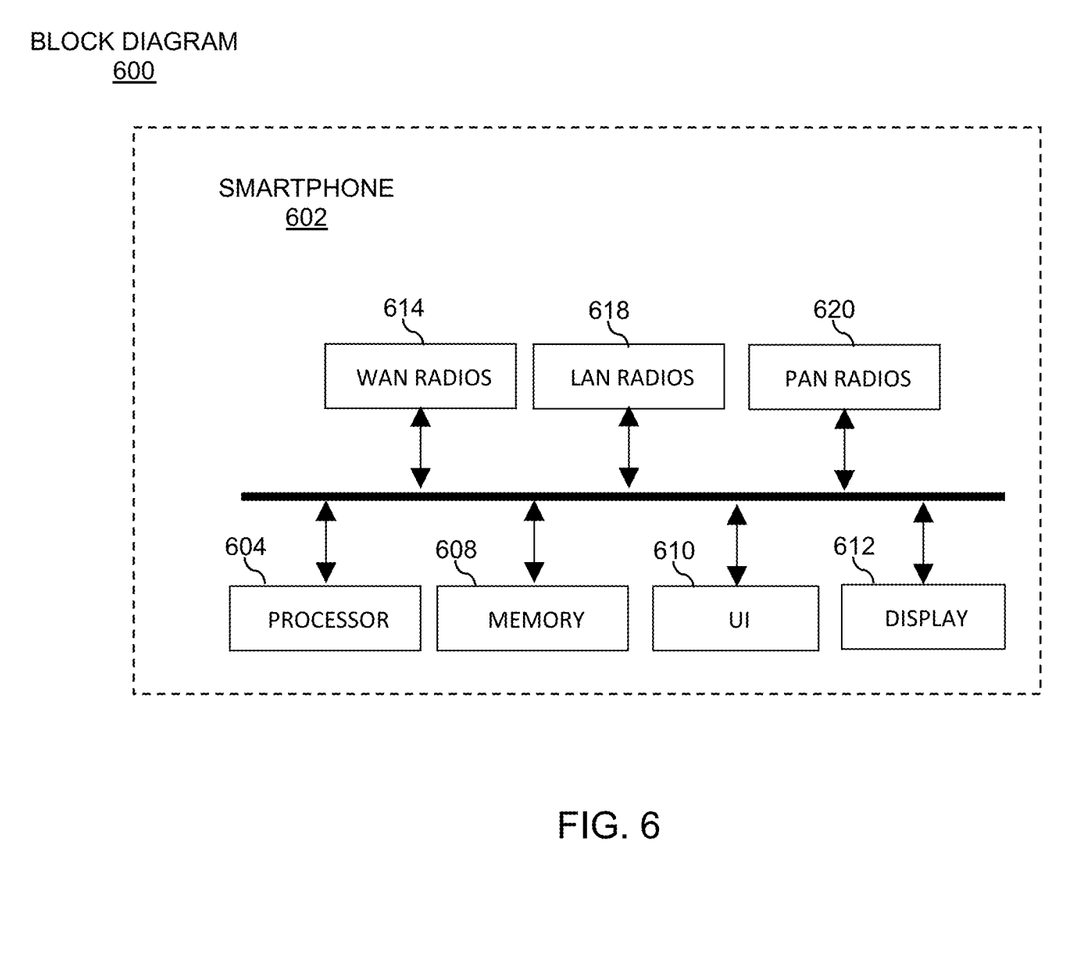
FIG. 6 depicts a block diagram of a smartphone in accordance with embodiments of the present disclosure.

FIG. 6 depicts a block diagram 600 of a smartphone 602 in accordance with embodiments of the present disclosure. The smartphone 602 is configured to provide at least one of the GUIs 112A-112C of FIG. 1 and may be representative of at least one of the mobile devices 208A-208C of FIG. 2. The smartphone 602 may also host the Fandex mobile app 210 of FIG. 2. The smartphone 602 may include at least a processor 604, a memory 608, a UI 610, a display 612, WAN radios 614, LAN radios 618, and personal area network (PAN) radios 620. In some embodiments the smartphone 602 may be an iPhone® or an iPad®, using iOS® as an OS. In other embodiments the smartphone 602 may be a mobile terminal including Android® OS, BlackBerry® OS, Chrome® OS, Windows Phone® OS, or the like.

In some embodiments, the processor 604 may be a mobile processor such as the Qualcomm® Snapdragon™ mobile processor. The memory 608 may include a combination of volatile memory (e.g. random access memory) and non-volatile memory (e.g. flash memory). The memory 608 may be partially integrated with the processor 604. The UI 610 and display 612 may be integrated such as a touchpad display. The WAN radios 614 may include 2G, 3G, 4G, and/or 5G technologies. The LAN radios 618 may include Wi-Fi technologies such as 802.11a, 802.11b/g/n, and/or 802.11ac circuitry. The PAN radios 620 may include Bluetooth® technologies.

Figure 7:
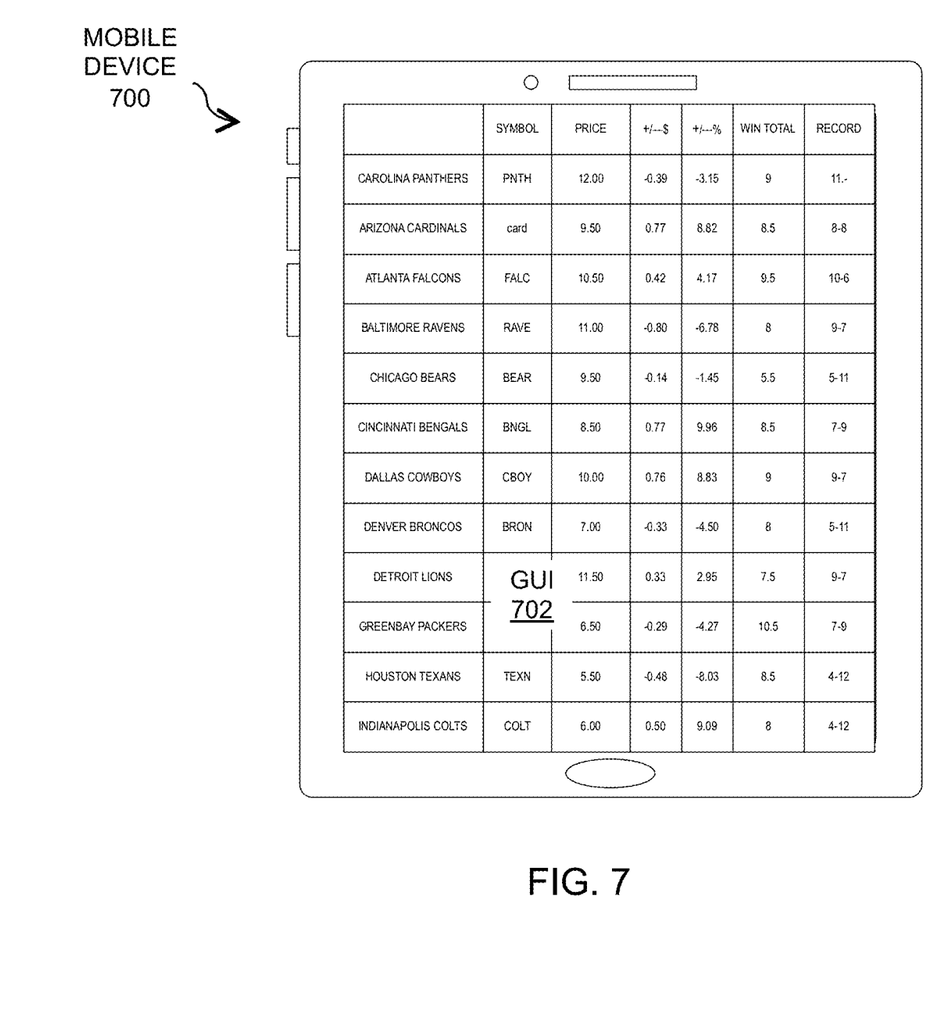
FIG. 7 depicts a mobile device illustrating a graphical user interface (GUI) in accordance with embodiments of the present disclosure.

FIG. 7 depicts a mobile device 700 illustrating a GUI 702 in accordance with embodiments of the present disclosure. The mobile device 700 may be the smartphone 602 of FIG. 6. In this illustration the GUI 702 depicts a screenshot of the Fandex mobile app 210. Per-share prices for a plurality of teams for a plurality of leagues are displayed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a networked computing environment including one or more servers configured to implement SOA (Service-Oriented Architecture) components for providing a sports league simulated stock exchange representing a plurality of real teams associated with a real sports league, wherein the SOA components comprise:
    (i) a first SOA back-end component of the one or more servers configured to communicate with a league schedule service to receive a first dataset including at least a portion of a season schedule associated with the real sports league;
    (ii) a second SOA back-end component of the one or more servers configured to communicate with a league statistics service to receive a second dataset including real statistics and game results associated with the real sports league; and
    (iii) an SOA front-end component of the one or more servers configured to communicate with a plurality of GUIs (Graphical User Interfaces) of remote devices through a network;
    wherein the first and second SOA back-end components are operable to be combined with the SOA front-end component to enable an operable SOA implementation for the sports league simulated stock exchange by:
    determining, using the first and second datasets obtained from the first and second SOA back-end components, a per-share value of a plurality of simulated shares associated with a first real team of the plurality of real teams or associated with individual players on the first real team, by valuing the simulated shares using a plurality of objective criteria which together determine a value of the first real team or players on the first real team;
    transmitting, using the SOA front-end component, the per-share value over the network to the plurality of GUIs of the remote devices; and
    upon all of the simulated shares being sold to users of the remote devices at the per-share value, the sports league simulated stock exchange transitions the per-share value of the simulated shares to trading values of the simulated shares, such trading values being determined in real time by buy and sell demands of the users of the remote devices thereby enabling volatility and competition.

2. The system of claim 1, wherein the sports league simulated stock exchange is configured for determining a first account balance of a first user and transmitting the first account balance to the GUI of the first user.

3. The system of claim 2, wherein determining the first account balance of the first user is based at least partially on a number of the simulated shares purchased by the first user.

4. The system of claim 1, wherein determining the per-share value further comprises determining a per-team Elo rating for each team of the plurality of real teams.

5. The system of claim 4, wherein determining the per-share value further comprises predicting results of a plurality of unplayed games in the portion of the season schedule using the per-team Elo rating for each team of the plurality of real teams.

6. The system of claim 5, wherein predicting the results of the plurality of unplayed games comprises predicting win probabilities and expected wins for each team for each game of the plurality of unplayed games.

7. The system of claim 6, further comprising a database, wherein the per-share value is a first per-share value, and wherein the sports league simulated stock exchange is configured for:
   storing, in the database, the first per-share value as at least a portion of a record in the database;
   receiving, via the second SOA back-end component, a third dataset including updated real statistics associated with the real sports league;
   determining, using the third dataset, a second per-share value of a plurality of simulated shares associated with the first real team of the plurality of real teams; and
   transmitting, using the SOA front-end component, the second per-share value over the network to the plurality of GUIs of the remote devices.

8. The system of claim 1, wherein the real statistics include preseason statistics.

9. The system of claim 8, wherein determining the first per-share value comprises determining a preseason per-share value of the plurality of simulated shares.

10. The system of claim 1, wherein the portion of the season schedule is at least a portion of a regular season schedule associated with the real sports league.

11. The system of claim 1, wherein the portion of the season schedule is at least a portion of a preseason schedule associated with the real sports league.

12. The system of claim 1, wherein the portion of the season schedule is at least a portion of a post-season schedule associated with the real sports league.

13. The system of claim 1, wherein the real sports league is at least one of the National Football League (NFL®), the National Basketball League (NBA®), the National Hockey League (NHL®), the Major League Baseball (MLB®) league, and the Major League Soccer (MLS®) league.

14. The system of claim 1, further comprising the remote devices, wherein the remote devices are configured to display the GUIs for interaction with the users.

15. The system of claim 14, wherein each remote device comprises one of a personal computer, a laptop, a tablet, a smart watch, a smart television, and a holographic projector.

16. The system of claim 15, wherein for each remote device, the GUI is provided by at least one of a web browser and a dedicated application.

17. The system of claim 16, wherein for each remote device, the GUI is configured to receive a plurality of per-share values associated with at least a portion of the plurality of real teams.

* * * * *